3,264,194
PROCESS FOR THE TRANSFORMATION OF STEROIDS USING A MUTANT STRAIN OF ARTHROBACTER (CORYNEBACTERIUM) SIMPLEX
Carlos Casas-Campillo, Mexico City, Mexico, assignor to Syntex Corporation, Panama, Panama, a corporation of Panama
No Drawing. Filed Sept. 16, 1963, Ser. No. 309,291
Claims priority, application Mexico, Nov. 16, 1962, 69,786
7 Claims. (Cl. 195—51)

The present invention relates to a novel process for preparing certain cyclopentanoperhydrophenanthrene derivatives.

More particularly, it relates to the transformation of the 3,21-diacetate of $\Delta^5$-pregnene-3$\beta$,17$\alpha$,21-triol-20-one into $\Delta^{1,4}$-3-keto-pregnadienes by incubation with a mutant strain of Arthrobacter (Corynebacterium) simplex ATCC 6946.

The dehydrogenation of $\Delta^4$-3-keto steroids using Corynebacterium simplex as a dehydrogenating agent is well known as described, for example by A. Nobile et al. in Journal of the American Chemical Society 77, 4184 (1955).

When the 3,21-diacetate of $\Delta^5$-pregnen-3$\beta$,17$\alpha$,-21-triol-20-one is placed in contact with a culture of Arthrobacter (Corynebacterium) simplex ATCC 6946 or with the enzymes produced by said microorganisms for a period of time in the order of 24 hours, a quick degradation of the steroid occurs, leaving approximately a 40% of the substrate without alteration. However, when the microorganism is previously irradiated with ultraviolet light there is obtained a series of mutants which act in a different manner in the presence of the steroid, giving rise to defined products.

In accordance with the present invention the surprising discovery has been made that when a culture of a mutant strain of Arthrobacter (Corynebacterium) simplex ATCC 6946 requiring arginine or tyrosine for its growth is placed in contact with the 3,21-diacetate of $\Delta^5$-pregnene-3$\beta$,17$\alpha$,21-triol-20-one in an adequate medium containing mainly sources of organic nitrogen and carbohydrates, there are obtained essentially two products: $\Delta^{1,4}$-pregnadiene - 17$\alpha$,21 - diol - 3,20 - dione and $\Delta^{1,4}$-pregnadiene-17$\alpha$,20$\beta$,21-triol-3-one, that is, in a single step, there are obtained saponification of the acetoxy groups at C-3 and C-21, oxidation of the hydroxyl group at C-3 with concomitant shifting of the double bond from C-5, 6 to C-4, 5, the introduction of an additional double bond between C-1 and C-2 and the partial reduction of the keto group at C-20.

The compounds obtained by the method object of the present invention are valuable intermediates for the synthesis of cortical hormones with therapeutical activity. Thus for example, by incubation of $\Delta^{1,4}$-pregnadiene-17$\alpha$,21-diol-3,20-dione ($\Delta^1$-dehydro "S") with adrenal glands, Curvularia lunata, Rizophus nigricans and the like, there are obtained prednisolone and epi-prednisolone, which in turn, upon oxidation by conventional methods are converted into prednisone, or by following the method of Fried produce the 9$\alpha$-halo derivatives of prednisone and prednisolone. As it is well known, these compounds are powerful anti-inflammatory agents used for example in the treatment of rheumatoid arthritis, allergic dermatitis, otitis, and the like. In addition, $\Delta^{1,4}$-pregnadiene-17$\alpha$,20$\beta$,21-triol-3-one may be degraded to eliminate the side chain using for example potassium bismuthate or periodic acid, to produce the $\Delta^{1,4}$-dehydro derivatives of the androstane series.

The method object of the present invention is illustrated by the following equation:

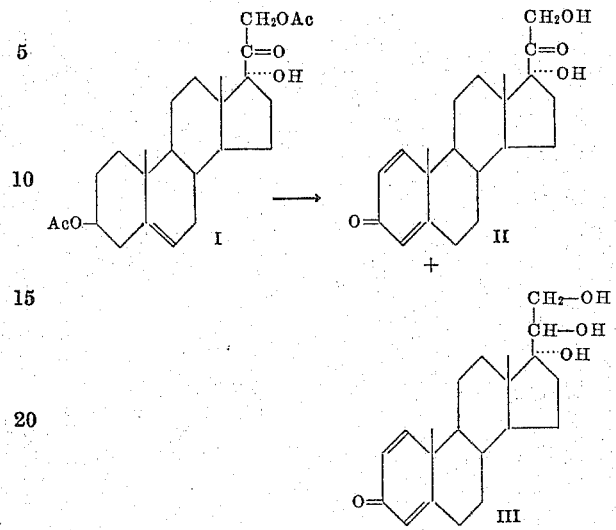

In practicing the process illustrated above, to a culture of a mutant strain of Corynebacterium simplex ATCC 6946, arginine-less or tyrosine-less, in a culture medium containing sources of organic nitrogen, carbohydrates and mineral salts, there is added under sterile conditions the 3,21-diacetate of $\Delta^5$-pregnene-3$\beta$,17$\alpha$,21-triol-20-one (I) and the mixture is stirred under aeration for a period of time of approximately 24 hours at a temperature comprised between 25 and 28° C. At the end of this time, the reaction products are isolated by extraction with a solvent non-miscible with water, using preferably chlorinated hydrocarbons. The total product of the incubation is purified by chromatography on silica gel, thus producing $\Delta^{1,4}$-pregnadiene-17$\alpha$,21-diol-3,20-dione (II) and $\Delta^{1,4}$-pregnadiene-17$\alpha$,20$\beta$,21-triol-3-one (III) in 15–18% and 30–35% yield respectively. In addition, 40–45% of starting material is recovered.

The mutant of Arthrobacter (Corynebacterium) simplex used in the novel method is obtained by irradiation with ultraviolet light of a microbial suspension of Arthrobacter (Corynebacterium) simplex ATCC 6946 in sterile water for a period of time of between 2 to 6 minutes, preferably for 3 minutes (180 seconds). This irradiation time is sufficient for obtaining a mortality of 99.99%. The mutants are recovered by following the classic techniques of Davis, B. D. (J. Am. Chem. Soc. 70, 4267; (1948)) and Lederberg, J., and Lederberg, E. M. (J. Bact., 63:399; 1952). The dependency to arginine or tyrosine of the mutant is demonstrated by auxanographic methods.

The composition of the culture medium for the method object of the present invention may be changed without influence in the nature of the products obtained. As sources of organic nitrogen, there are used commercial products such as Casitone or casein hydrolyzate, vitamin-free; different aminoacids such as arginine or tyrosine may also be used, since the mutant is dependent on these amino-acids. Glucose is used mainly as a source of carbon.

The culture medium may contain in addition, different salts, such as mono- and di-potassium phosphates, ammonium sulfate, magnesium sulfate, sodium citrate and the like.

The steroid may be added to the culture of the mutant of Arthrobacter (Corynebacterium) simplex in solid form or dissolved in a solvent miscible with water, such as dioxane, ethanol or acetone. The reaction products are recovered by extraction with chlorinated hydrocarbons using preferably methylene chloride, ethylene di-chloride, chloroform, carbontetrachloride, and other similar solvents.

The nature of the products obtained is determined by paper chromatography in accordance with Zaffaroni's method (Recent Progress in Hormone Research, vol. VIII, pp. 51–86 (1953)). The reaction products are separated as hereinbefore indicated by chromatography on silica-gel-Celite, eluting the column with mixtures of methylene chloride-ethyl acetate, pure ethyl acetate, and mixtures of ethyl acetate-acetone.

The following examples serve to illustrate the present invention but are not intended to limit its scope:

PREPARATION

The growth of *Arthrobacter* (*Cornebacterium*) *simplex* ATCC 6946, obtained after incubation in a medium of Casitone-glucose-agar, at 28° C. for 24 hours using inclined tubes was suspended in 10 cc. of sterile distilled water; the cells were separated by centrifugation and washed twice with 10 cc. of distilled water; they were finally suspended in 10 cc. of distilled water and the suspension was transferred to a Petri dish, also sterile which was placed under a 15 volts ultraviolet light lamp (General Electric) germicide type, at a distance of 39 cm. The irradiation was continued for 3 minutes maintaining the bacterial suspension under stirring, using rotatory shaker (at 130 r.p.m.). The mutants were recovered by following the technique of Davis, B. D. (J. Am. Chem. Soc., 70,4267 (1948), i.e., by its resistance to the action of penicillin. The dependency to arginine or tyrosine was demonstrated by auxanographic methods.

Example I

The surface growth obtained after growing the mutant strain of *Arthrobacter* (*Corynebacterium*) *simplex* on Casitone-glucose-agar slants, at 28° C. for 48 hours was suspended in 10 cc. of distilled water, washed twice with water by centrifugation and resuspended in the same volume of distilled water. Portions of 1 cc. of this suspension were used to inoculate twenty 250 cc. Erlenmeyer flasks containing each 50 cc. of the following culture medium:

| | G. |
|---|---|
| Dipotassium phosphate | 7.0 |
| Monopotassium phosphate | 3.0 |
| Ammonium sulphate | 1.0 |
| Sodium citrate | 0.5 |
| Magnesium sulfate heptahydrate | 0.1 |
| Glucose | 2.0 |
| Casein hydrolyzate (vitamins-free) | 2.0 |
| Distilled water to complete 1000 cc. | |

The flasks were stirred under aeration and submerged conditions (rotatory shakers) for 48 hours at 25–28° C., to obtain an abundant growth of the microorganisms. To each flask it was then added a solution of 10 mg. of the 3,20-diacetate of $\Delta^5$-pregnene-3$\beta$,17$\alpha$,21-triol-20-one in 0.2 cc. of dioxane and the incubation was continued for 24 hours further. The content of the flasks was combined and extracted several times with methylene chloride, the extract was washed with water, dried over anhydrous sodium sulfate and evaporated to dryness under reduced pressure. The residue was dissolved in methylene chloride and chromatographed on 3 g. of silica gel and 3 g. of Celite. The fractions eluted with mixtures of methylene chloride, ethyl-acetate 40/60 gave 31 mg. of $\Delta^{1,4}$-pregnadiene-17$\alpha$,21-diol-3,20-dione, M.P. 234–235° C.;

and the fractions eluted with pure ethyl acetate and ethyl-acetate-acetone 90/10 gave 68 mg. of $\Delta^{1,4}$-pregnadiene-17$\alpha$,20$\beta$,21-triol-3-one, M.P. 188–192° C. $\lambda$max. 246 m$\mu$ log. $\epsilon$ 4.19, identical to authentic samples of these compounds.

Example II

The preceding example was repeated but in the culture medium there was used tyrosine (0.5%) instead of the casein hydrolyzate; in addition, the ammonium sulfate was omitted, to produce also $\Delta^{1,4}$-pregnadiene-17$\alpha$,21-diol-3,20-dione and $\Delta^{1,4}$-pregnadiene-17$\alpha$,20$\beta$,21-triol-3-one in similar yields.

Example III

In the method of the preceding example tyrosine was substituted by arginine, thus producing $\Delta^{1,4}$-pregnadiene-17$\alpha$,21-diol-3,20-dione in 17% yield and $\Delta^{1,4}$-pregnadiene-17$\alpha$,20$\beta$,21-triol-20-one in 34% yield.

Example IV

The growth of the mutant strain of *Arthrobacter* (*Corynebacterium*) *simplex* ATCC 6946 obtained as described in Example I was suspended (1 cc. fractions) in twenty 250 cc. Erlenmeyer flasks containing each 50 cc. of an aqueous medium which contained only 2% of Casitone and 0.5% of glucose.

The flasks were stirred at 25–28° C. for 24 hours (rotatory stirring) and to each flask it was added 10 mg. of the 3,21-diacetate of $\Delta^5$-pregnene-3$\beta$,17$\alpha$,21-triol-20-one. The incubation was continued for 24 hours further and then the content of the flasks was extracted with methylene chloride, the extract was washed with water, dried over anhydrous sodium sulfate and evaporated to dryness. The residue was analyzed by paper chromatography and spectroscopy, to produce also $\Delta^{1,4}$-pregnadiene - 17$\alpha$,21 - diol - 3,20 - dione and $\Delta^{1,4}$-pregnadiene-17$\alpha$,20$\beta$,21-triol-3-one.

I claim:

1. A process for preparing $\Delta^{1,4}$-pregnadiene-17$\alpha$,21-diol-3,20-dione and $\Delta^{1,4}$-pregnadiene-17$\alpha$,20$\beta$,21-triol-3-one which comprises incubation of the 3,21-diacetate of $\Delta^5$-pregnene-3$\beta$,17$\alpha$,21-triol-3,20-dione with a culture of a mutant strain of *Arthrobacter* (*Corynebacterium*) *simplex* ATCC 6946 in an adequate aqueous medium, followed by separation of the reaction products by chromatography.

2. The process of claim 1 wherein the mutant strain of *Corynebacterium simplex* used is arginine-less.

3. The process of claim 1 wherein the mutant strain of *Corynebacterium simplex* used is tyrosine-less.

4. The process of claim 1 wherein the incubation is effected in an aqueous medium containing sources of organic nitrogen, carbohydrates and mineral salts.

5. The process of claim 1 wherein the culture medium contains casein hydrolyzate, vitamins-free as source of organic nitrogen.

6. The process of claim 1 wherein the culture medium contains tyrosine.

7. The process of claim 1 wherein the culture medium contains arginine.

References Cited by the Examiner

UNITED STATES PATENTS

| 3,166,482 | 1/1965 | Kluepfel et al. | 195—51 |
| 3,189,528 | 6/1965 | Smith et al. | 195—51 |

A. LOUIS MONACELL, *Primary Examiner.*

D. M. STEPHENS, *Assistant Examiner.*